(12) United States Patent
Redcay, Jr.

(10) Patent No.: US 6,269,341 B1
(45) Date of Patent: Jul. 31, 2001

(54) METHOD AND SYSTEM FOR PRINTING INDIVIDUALIZED CALENDARS

(75) Inventor: James Elias Redcay, Jr., Allentown, PA (US)

(73) Assignee: Day-Timers, Inc., East Texas, PA (US)

( * ) Notice: Subject to any disclaimer, the term of this patent is extended or adjusted under 35 U.S.C. 154(b) by 0 days.

(21) Appl. No.: 09/108,247

(22) Filed: Jul. 1, 1998

(51) Int. Cl.[7] .................................................. G06F 17/60
(52) U.S. Cl. ................................................. 705/8; 345/963
(58) Field of Search ................... 705/7, 8, 9, 5; 345/963; 40/107, 119

(56) References Cited

U.S. PATENT DOCUMENTS

| | | | |
|---|---|---|---|
| D. 411,230 | 6/1999 | Crooks et al. | D19/20 |
| D. 411,232 | 6/1999 | Carey et al. | D19/33 |

(List continued on next page.)

FOREIGN PATENT DOCUMENTS

| | | | |
|---|---|---|---|
| 3291749 | * 12/1991 | (JP) | G06F/15/21 |
| 9254568 | * 12/1991 | (JP) | B42D/5/04 |
| 5169879 | * 7/1993 | (JP) | B42D/5/04 |
| 5169880 | * 7/1993 | (JP) | B42D/5/06 |
| 8-127189 | * 5/1996 | (JP) | B42D/5/04 |

OTHER PUBLICATIONS

IBM Technical Disclosure Bulletin, "Provide a Personal Work Schedule in an Electronic Calendar", vol. 34, No. 7B, pp. 482–48.3, Dec. 1991.*

IBM Technical Disclosure Bulletin, "Calendar Event Separator Character", vol. 34, No. 8, p. 326, Jan. 1992.*

IBM Technical Disclosure Bulletin, "Printing Business/Personal To Do List on a Daily Calendar", vol. 34, No. 9, pp. 75–76, Feb. 1992.*

Merrill et al., "New Calendar Creator and Address Book Programs Organize Business Activities", Power Up Software Corporation, Trade Magazine, P1, Jan. 1991.*

Dr. Pershing, "Calendar Creator, Part of Promotion", Business Publishers, Inc., Education Technology News, v9, n17, Aug. 1992.*

Hooper, Milton L., "Client/Server Scheduling Solution", (Campbell Services' On Time 4.0 Group Scheduler PIM), Law Office Computing, 7, n4, 32(1), Aug. 1997.*

Freeman, Angela, "Best Calendars", (The Learning Company's Calendar Creator 5.0 desktop accessory), PC World, v16, n4, P88 (1), Dec. 1991.*

Primary Examiner—Eric W. Stamber
Assistant Examiner—Hani M. Kazimi
(74) Attorney, Agent, or Firm—Pennie & Edmonds LLP

(57) ABSTRACT

A method and system for making an individualized calendar which includes personalized information. The personalized information includes a special event date with its description for an individual for whom the calendar is to be made. The personalized information is received and managed at a central location. The individualized calendar is electronically created by formatting the personalized information along with pre-formatted calendar layouts. The formatted individualized calendar is then printed.

20 Claims, 10 Drawing Sheets

U.S. PATENT DOCUMENTS

| | | | |
|---|---|---|---|
| D. 411,233 | 6/1999 | Finch et al. | D19/33 |
| D. 411,234 | 6/1999 | Lord et al. | D19/33 |
| D. 411,235 | 6/1999 | Lord et al. | D19/33 |
| D. 411,569 | 6/1999 | Crooks et al. | D19/20 |
| D. 411,571 | 6/1999 | Carey et al. | D19/33 |
| D. 411,572 | 6/1999 | Lord et al. | D19/33 |
| D. 411,573 | 6/1999 | Carey et al. | D19/33 |
| D. 411,574 | 6/1999 | Lord et al. | D19/33 |
| 3,999,050 | 12/1976 | Pitroda . | |
| 4,276,703 * | 7/1981 | Brindley | 40/121 |
| 4,853,852 | 8/1989 | Rosen . | |
| 5,103,490 | 4/1992 | McMillin . | |
| 5,134,669 | 7/1992 | Keogh et al. . | |
| 5,202,206 | 4/1993 | Tam . | |
| 5,233,533 | 8/1993 | Edstrom et al. . | |
| 5,291,243 | 3/1994 | Heckman et al. . | |
| 5,325,484 | 6/1994 | Motoyama . | |
| 5,457,904 * | 10/1995 | Colvin | 40/119 |
| 5,459,819 | 10/1995 | Watkins et al. . | |
| 5,459,826 | 10/1995 | Archibald . | |
| 5,506,697 | 4/1996 | Li et al. . | |
| 5,570,109 * | 10/1996 | Jenson | 345/146 |
| 5,625,766 | 4/1997 | Kauffman . | |
| 5,719,826 | 2/1998 | Lips . | |
| 5,729,665 | 3/1998 | Gauthier . | |
| 5,732,399 | 3/1998 | Katiyar et al. . | |
| 5,740,338 | 4/1998 | Gauthier et al. . | |
| 5,742,563 * | 4/1998 | Kataoka et al. | 368/24 |
| 5,749,074 | 5/1998 | Kasso et al. . | |
| 5,855,006 * | 12/1998 | Huemoeller et al. | 705/9 |
| 5,930,924 * | 8/1999 | Beard | 40/107 |
| 5,960,406 * | 9/1999 | Rasansky et al. | 705/9 |
| 6,016,478 * | 1/2000 | Zhang et al. | 705/9 |
| 6,018,343 * | 8/1999 | Wang et al. | 345/356 |

* cited by examiner

| CUSTOM ENTRIES FOR THE YEAR: | |
|---|---|
| DATE | EVENT |
| 7/3 | PHILLIE'S BASEBALL GAME AT VET STADIUM |
| 7/4 | #1-INDEPENDENCE DAY |
| 7/5 | #1-4TH OF JULY PICNIC AT RON'S CABIN |
| 7/10 | DAY AT KNOEBEL'S GROVE |
| 7/16 | PHANTOM OF THE OPERA IN NEW YORK VIA BIEBER BUS |
| 7/22 | SWIMMING PARTY AT AL'S HOUSE |
| 7/25 | MEETING WITH THE THOMPSON'S |
| 7/30 | JACK & MELISSA'S WEDDING REHEARSAL DINNER |
| 8/1 | JACK & MELISSA'S WEEDING 2:00 |
| 8/3 | DENTIST APPOINTMENT AT 4:00 FOR JOHN |
| 8/5 | LEAVE FOR VACATION IN THE POCONOS |
| 8/16 | PIE EATING CONTEST AT THE PARK |
| 8/22 | STRAWBERRY FESTIVAL |
| 8/25 | RACE AT NAZARETH 10:00 |
| 8/28 | HARVEY'S FIRST DAY OF WORK |
| 8/30 | NINA'S DANCE SCHOOL LESSON |
| 9/6 | LABOR DAY PICNIC AT ROGERS |
| 9/7 | LABOR DAY |
| 9/9 | FIRST DAY OF SCHOOL FOR JOHNNY |
| 9/16 | MEETING WITH JOHNNY'S TEACHER |
| 9/20 | CHRISTA'S BIRTHDAY PARTY AT PIZZA HUT |
| 9/22 | MARK'S MEETING WITH DAVE AT 2:00 |
| 9/25 | LUNCH WITH JULIE AT BUCKEYE TAVERN |
| 9/30 | MEETING WITH STAN |
| 10/2 | GET PASSPORT FOR UPCOMING BUSINESS TRIP |
| 10/2 | DOCTOR APPOINTMENT FOR SHOTS |
| 10/2 | START PACKING |
| 10/2 | CHECK WITH SECRETARY ABOUT RESERVATIONS |
| 10/13 | LEAVE ON COMPANY TRIP TO CHINA |
| 10/16 | MEETING WITH MITSUBISHI REPRESENTATIVE |
| 10/20 | DINNER AT 6:00 WITH THE MOYERS |
| 10/23 | RETURN FROM TRIP TO CHINA |
| 10/25 | MEETING WITH JOHN ROGERS |
| 10/30 | SUSIE'S HALLOWEEN PARTY AT SCHOOL 1:00 |
| 10/31 | HALLOWEEN COSTUME PARTY |
| 11/6 | PATRICK'S PARTY AT SCHOOL |
| 11/11 | PATRICIA'S BIRTHDAY |
| 11/18 | TICKETS FOR BULL'S GAME |
| 11/22 | MOM'S RETIREMENT PARTY |
| 11/25 | SHOPPING FOR THANKSGIVING MEAL |
| 11/26 | THANKSGIVING JANE'S TEACHER |
| 11/28 | MEETING WITH JANE'S TEACHER |
| 11/30 | MARTHA'S TUPPERWARE PARTY |
| 12/1 | SHOPPING WITH MOM |
| 12/5 | MARTHA'S TUPPERWARE PARTY |
| 12/8 | SHOPPING WITH MOM |
| 12/16 | NEIGHBORHOOD DINNER PARTY |
| 12/18 | KAYE'S BIRTHDAY |
| 12/24 | DAVE COMES HOME FROM COLLEGE |
| 12/25 | CHRISTMAS AT MOM'S HOUSE |

FIG. 3

| THURSDAY • JULY 2, 1998 | | | 183rd Day, 182 Day Left | |
|---|---|---|---|---|
| TO BE DONE TODAY (ACTION LIST) | APPOINTMENTS & SCHEDULED EVENTS | | DIARY AND WORK RECORD • EXPENSES | $/TIME |
| | | 8 0800 | | |
| | | 9 0900 | | |
| | | 10 1000 | | |
| | | 11 1100 | | |
| | | 12 1200 | | |
| | | 1 1300 | | |
| | | 2 1400 | | |
| | | 3 1500 | | |
| | | 4 1600 | | |
| | | 5 1700 | | |

| FRIDAY • JULY 3, 1998 | | | 184th Day, 181 Day Left | |
|---|---|---|---|---|
| | | 8 0800 | | |
| | | 9 0900 | | |
| | | 10 1000 | | |
| | | 11 1100 | | |
| | | 12 1200 | | |
| | | 1 1300 | | |
| | | 2 1400 | | |
| | | 3 1500 | | |
| | | 4 1600 | | |
| | | 5 1700 | | |

| SATURDAY • JULY 4, 1998 | | | INDEPENDENCE DAY (USA) | |
|---|---|---|---|---|
| JULY 4th PICNIC UNCLE TOM | | | | |
| | | 8 0800 | | |
| | | 9 0900 | | |
| | | 10 1000 | | |
| | | 11 1100 | | |
| | | 12 1200 | | |

| SUNDAY • JULY 5, 1998 | | | 186th Day, 179 Day Left | |
|---|---|---|---|---|
| UNCLE HOGJOWL'S BIRTHDAY | | | | |
| | | 8 0800 | | |
| | | 9 0900 | | |
| | | 10 1000 | | |
| | | 11 1100 | | |
| | | 12 1200 | | |

DESK  TWO PAGE-PER-WEEK

FIG. 6

| ITEM NO | \multicolumn{2}{c}{TO BE DONE IN JULY} |
|---|---|---|
| | \multicolumn{2}{c}{SUBJECT} |
| | 7/1 | AUNT MILLIE'S 50TH BIRTHDAY |
| | 7/4 | JULY 4th PICNIC UNCLE TOM |
| | 7/5 | UNCLE HOGJOWL'S BIRTHDAY |
| | 7/14 | BOSS HOG'S BIRTHDAY |
| | 7/18 | THE SMITH'S DINNER PARTY |
| | 7/22 | HILLBILLY JIM'S SWAMP PARTY |
| | 7/25 | END OF SNIPE SEASON |
| | 7/31 | BEGINNING OF SNIPE SEASON |

DESK   • - Doesn't fit on following page   w - weekly event   m - monthly event   TWO PAGE-PER-MONTH

FIG. 8

METHOD AND SYSTEM FOR PRINTING INDIVIDUALIZED CALENDARS

BACKGROUND OF THE INVENTION

Conventional printing methods include at least two categories. The first category is a digital printing method which includes a print-on-demand method and a publish-on-demand method. The print-on-demand method has been used to print two-sided copies of mass mailing advertisements with some individualized information printed on each of the copies. However, the print-on-demand is only suited for small scale production, too small for use on large scale commercial applications, because, among other reasons, the print-on-demand method is limited to printing one distinct final print-product per page.

The first category also includes the publish-on-demand method, which has been used for printing books and magazines where the copies are produced in a low volume, around one hundred copies. In this method, identical copies, without personalized data, can be published, which is ideal for individuals who want to print a small quantity of family histories or other memoirs. Because the copies printed using the publish-on-demand method are all identical, however, no individualized copies can be printed.

The second category is used in the printing of books, magazines or newspapers where thousands of identical copies are printed using an off-set printing method. This category is referred as commercial printing. In commercial printing, rather than printing individual final print-products, a signature page is printed. FIG. 1 illustrates an example of a signature page 21 which is an amalgamation of final print products including date pages. Hence, when the signature page 21 is folded and cut, it becomes many date pages. The signature pages are ideal for the commercial printing method because the signature pages are readily adaptable to a high-volume, high-speed printing and binding production assembly line. In particular, each signature page includes print-marks such as cutting marks 25, and folding marks 26. When a large number of the signature pages are printed, the print-marks are utilized in a subsequent assembly line production of final print-products, which in this example are calendars. In the assembly line processing, the signatures are folded at the trimming mark.

However, the commercial printing method cannot print individualized final products since the commercial printing process does not provide for variation of the printed matter.

The printing process is typically assisted by computer print applications such as Adobe Illustrator® and Quark®. In the conventional print applications, the textural and graphical contents of print-products to be produced are entered using the print applications. Once the contents are entered into the print applications, the applications generate print description language (PDL) commands with which to drive printers to print the entered contents.

Recently, Postscript® has become the most popular page description language for printers. As a result, once a print application generates the contents in Postscript® commands, most printers can receive and interpret the Postscript® commands to print the content.

In order to print a page with a number of final products as in the signature page, an imposition file must be generated. The imposition file includes the PDL commands describes how each final print product is to be arranged within the signature page. For example, in FIG. 1, the imposition file describes the location of the date pages for "January 6" 23 and "January 8" 27. In addition, in imposition files generated by the conventional print applications, every aspect relating to the signature page must be hard coded. For example, the imposition file must include commands relating to fonts of the texts, location of each line, location of each text for each date page, among others. A large computer memory space is thus required to maintain the imposition files. Furthermore, any alteration to the imposition files requires a cumbersome revision process because an entire new imposition file must be generated even if only a small part of the signature page is to be changed.

These deficiencies are amplified when individualized copies are to be printed on the voluminous production scale of the commercial printing method. For instance, for each copy or distinct print product to be printed, a new imposition file must be created to include the different information in each print product. This would require extremely costly expenditures in computer capital investments and an extremely high level of computing time.

SUMMARY OF THE INVENTION

This invention relates generally to the computer aided printing of individualized calendars, and more specifically, relates to high-speed and high-volume printing of individualized calendars.

The individualized calendars are printed with personalized information that includes special event dates and their descriptions. The personalized information is selected for individuals for whom the calendars are to be made.

In making the individualized calendar, the personalized information is dynamically combined with a pre-formatted standard or pattern, such as a non-individualized calendar layout. Then, a resulting combined calendar is printed. The dynamic combination of the pre-formatted standard calendar layout with the personalized information eliminates the need to create a separate pre-formatted calendar for each individualized calendar. This results in efficient printing of individualized calendars.

BRIEF DESCRIPTION OF THE DRAWINGS

FIG. 3 is an example of personalized event list;

FIG. 6 is an example of a weekly plan calendar;

FIG. 8 is an example of a "To Be Done" calendar page;

DETAILED DESCRIPTION OF THE PREFERRED EMBODIMENTS

Figure 2:
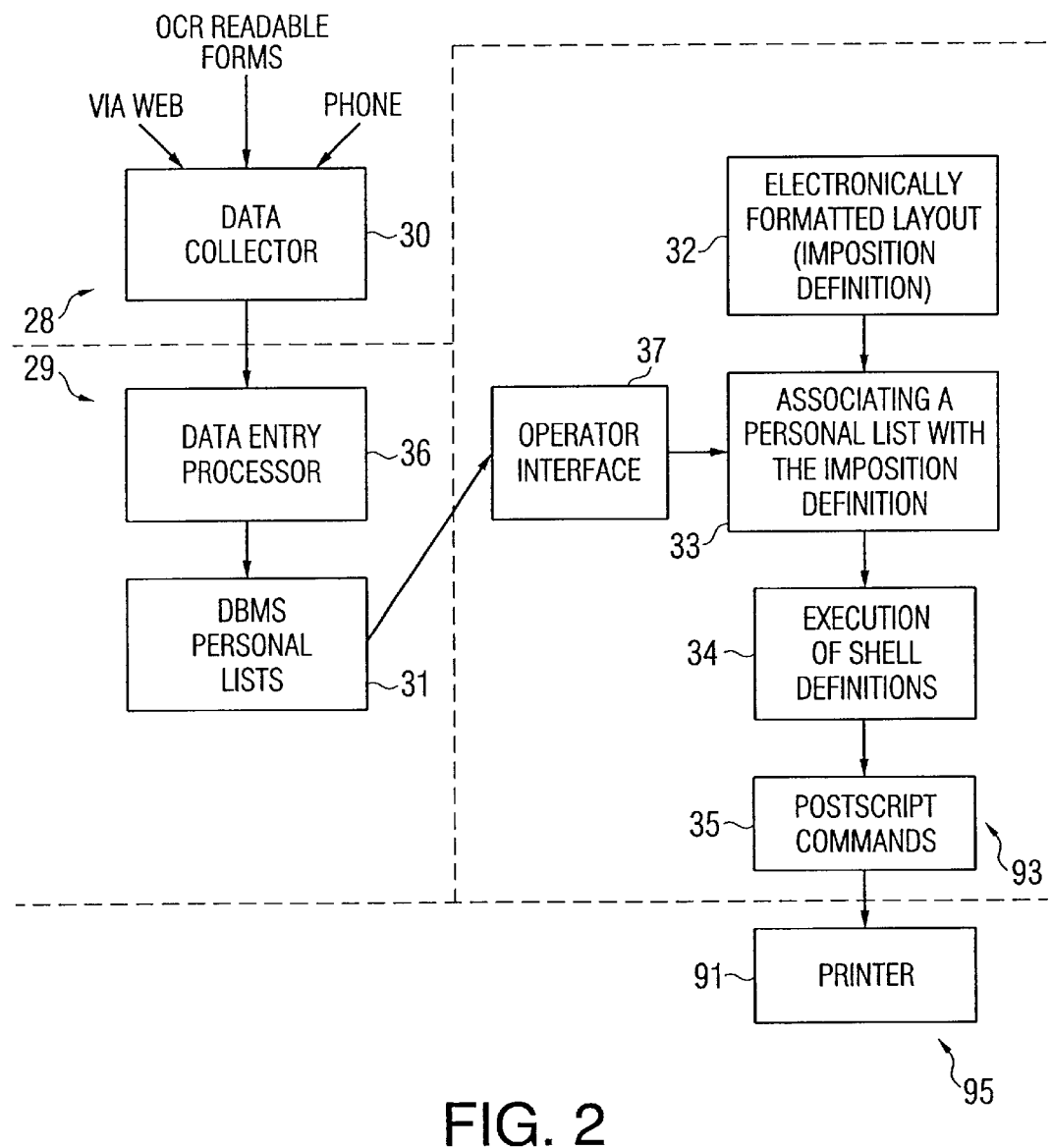
FIG. 2 is an overall schematic of the present invention.

Referring to FIG. 2, in printing an individualized calendar, a customer selects and enters personalized information for the individual for whom the individualized calendar is being produced. The customer, in location 28, enters the personalized data using a data collector 30. The personalized information includes special dates such as birthdays and anniversaries of family members, and other personalized events corresponding particularly to that customer. The personalized information also includes descriptions for each of the special dates, as shown in FIG. 3.

The personalized information preferably also includes personal choices of the language with which the calendar is to be printed, a designated country for its national holidays, and game days scheduled for professional sports teams. Furthermore, the customer has choices in selecting calendar types which include yearly calendars, monthly calendars and daily planners. The personalized information also includes a selection of size and color of the calendar.

The data collector 30 includes a medium to allow the customer to select and enter personalized information. The medium is preferably a web-site in the Internet specifically designed for entering such data, machine readable data entry forms with spaces to write the personalized information, a CD-ROM or magnetic medium such as a floppy disk with computer programs which allow the personal information selections to be made, or a telephone by calling an operator at a data receiving location 29. In the case of the selections made on the web-site, they are directly sent to the data receiving location 29 and entered into a data entry processor 36. If the selections are made on the machine readable form, the CD-ROMs, and/or the floppy disk, they are delivered to the data receiving location 29. The selections are entered to the data entry processor. In the case of personal information entry by a telephone operator, the selections are entered by the operator into the data entry processor.

The data processor, preferably a personal computer, temporarily stores the selections. The stored selections are processed by a data entry operator, or preferably by a computer program operating in the data processor. The processing of the stored selections includes screening, formatting and entering the selections into a database management system (DBMS) 31. The DBMS 31 preferably employs a relational database management system as its DBMS engine, to receive, store and manage the customer selections.

The stored information in the DBMS 31 corresponding to many different customers is maintained and updated on a regular basis, preferably every year and more preferably every month, by the customers by adding, deleting or modifying the stored information. Subsequently, the customers make requests to print individualized calendars that include the personalized information. In one embodiment, prior to any other steps are taken, the customer's account balances are checked to ensure the balances will cover the cost of producing the requested individualized calendars. In another embodiment the customers are billed for the individualized calendars. In any event, an accounting system is provided for collecting and managing requisite fee payments for printing the requested individualized calendars.

In printing the requested individualized calendars, an operator electronically associates a pre-formatted layout 32 with the requested customer's personalized information 33. In one preferred embodiment, each calendar type has a corresponding pre-formatted calendar stored electronically. The pre-formatted layout associated with the personalized information then is executed to generate print commands in a PDL which is directly interpretable by a printer, preferably in Postscript®, thus rendering the pre-formatted layout independent of any particular printer 34 and 35.

Figure 4:
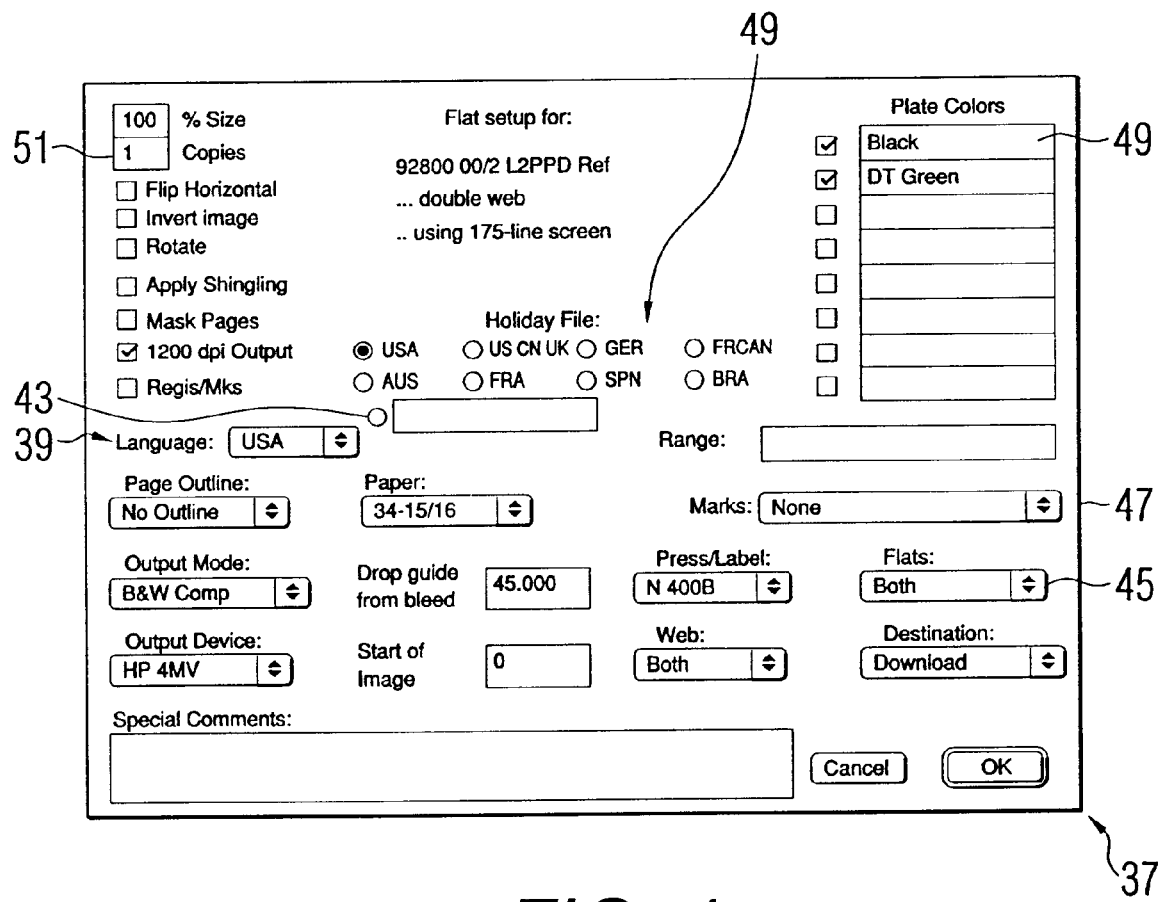
FIG. 4 is a example user interface for generating run-time set-up parameters.

As shown in FIG. 2, the system is preferably provided with an operator interface 37. This operator interface 32 is preferably a graphical user interface, as shown in FIG. 4. The operator interface 37 is provided to help an operator associate the personal information selected by a customer with an electronically pre-formatted layout.

The interface includes an arrangement of fields and options preferably including a language option 39, by which a choice in language is provided, e.g. French, German, Spanish among others; an international holiday option 41 by which a choice of national holidays of different countries is provided; a field in which a personalized event list is entered 43; and a number of fields 45, 47, 49, and 51 which relate to print options such as size, number of copies to be printed, production markings, and date and/or ranges, respectively.

A fully automated embodiment does not have the operator interface. In this embodiment, when a customer enters a request to print an individualized calendar, the selected personalized information is transferred automatically and is associated with corresponding pre-formatted layouts. This eliminates the operator and thus lowers cost and reduces errors inadvertently introduced by an operator.

In another preferred embodiment, the information entered in each of antecedent are collected and accumulated for a high-volume batch-print-run. During the batch run, the personalized information is directly associated with corresponding pre-formatted layouts meeting the patterns. In this embodiment, the printed individualized calendars are preferably sent to an assembly line for cutting and binding each individual calendar. This method of printing and producing a large number of individualized calendars saves operating costs in making the calendars.

Figure 5:
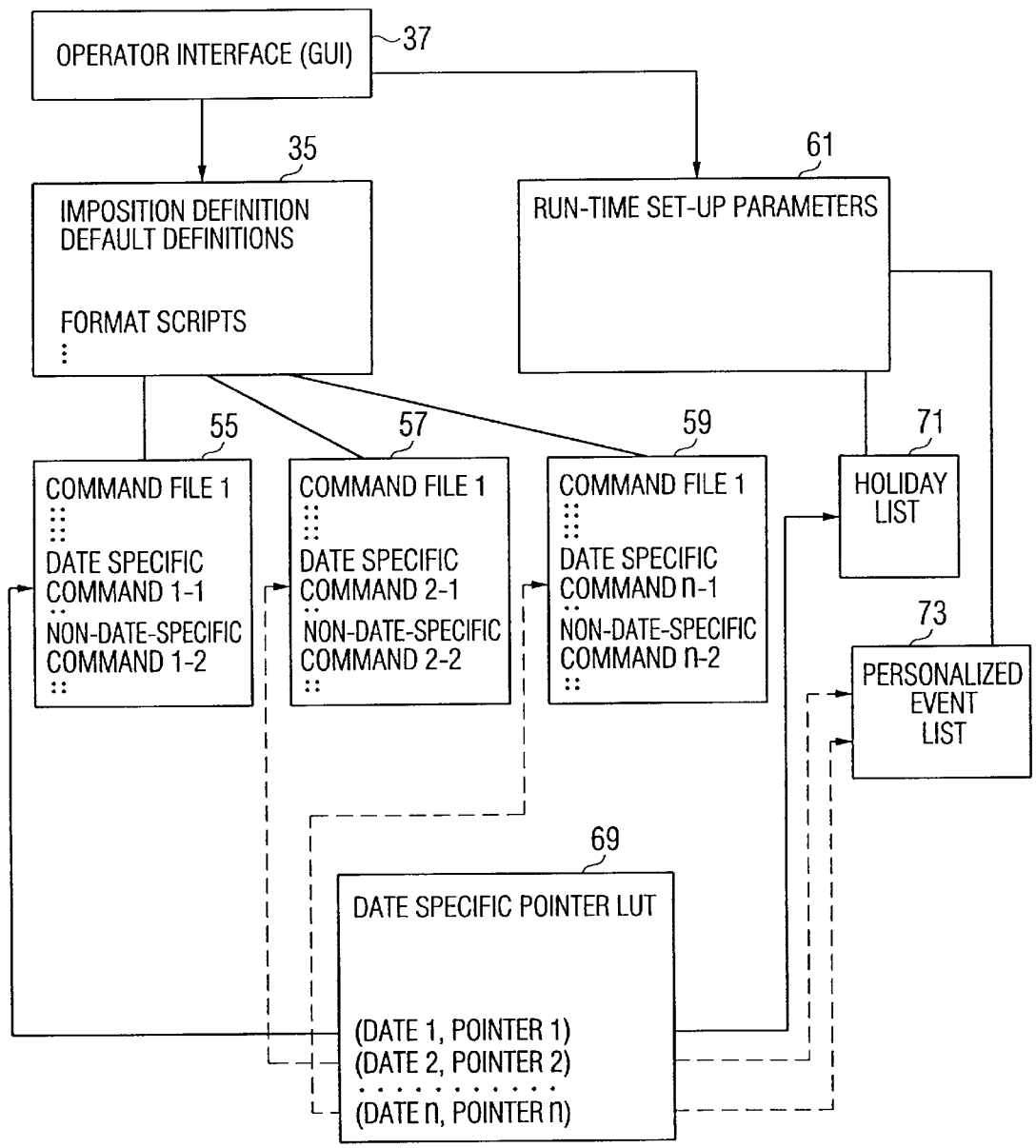
FIG. 5 is a block diagram illustrating relationships among different components of the present invention.

Regardless of whether an operator or an automated system is used, each pre-formatted layout is formatted by an imposition definition. An imposition definition includes a default data field where definitions such as the size of papers and calendar period information, such as the start and end dates of the calendar to be printed, are provided. A list containing a predetermined number of format scripts making references to command files 55, 57 and 59 of FIG. 5 is also provided in the default data field. The default definitions are augmented by the run-time set-up parameters 61, which change the default definitions with the customer-provided personalized information. The format script is a script command that has a specific date referencing one of the command files.

The command files are preferably written in a high-level print description language (HPDL). The HPDL is a form of shorthand used in the present invention to describe the formatting steps. Each command file includes the HPDL commands describing how each page layout, i.e., each distinct type of calendar pages, is to be formatted and the patterns the layout will include. The distinct types of pages preferably include a weekly planner, shown in FIG. 6, a monthly planner shown in FIG. 7, and a "To Be Done" list shown in FIG. 8. As each type of page, shown in FIGS. 6–8, has its own arrangement and patterns. Thus, each command file includes a specific set of HPDL commands to format the corresponding page.

Figure 7:
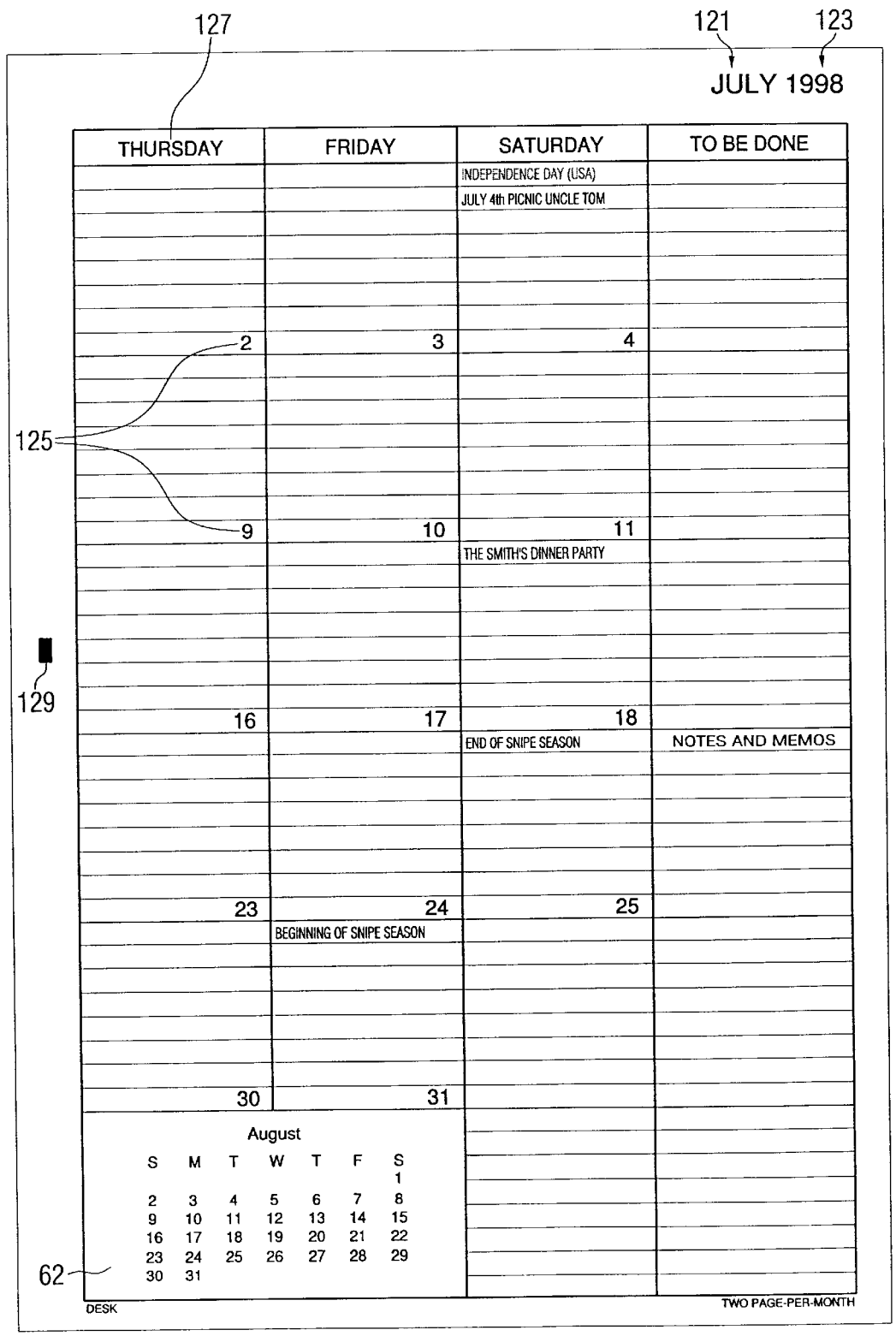
FIG. 7 is an example of a monthly plan calendar.

For example, the command file for the monthly planner in FIG. 7 includes commands to draw vertical and horizontal lines and to locate the days of the week, among other commands. The command file, however, preferably does not have specific dates associated with it. Therefore, if the command file is printed without a date specified therewith, then the monthly planner in FIG. 7 would not show dates or the monthly calendar 62.

Therefore, an imposition definition 35 for making a formatted layout that includes a "To Be Done" list, a monthly planner and four weekly planners must include format scripts that reference corresponding command files, namely, one command file for the "To Be Done" list, one command file for the monthly planner and four command files for the four weekly planners. Furthermore, each of the referenced command files is associated with a specific date or range of dates by the format scripts.

When a format script in the imposition definition 35 is executed, the specific date in the format script becomes associated with the referenced command file. The specific syntax of the format script is created for this invention. The HPDL commands are then translated into a PDL directly interpretable by a printer. The PDL is preferably Postscript® so that the translated PDL commands are portable among different printers.

The HPDL commands for the command files 55, 57, 59 include: conventional non-date-specific commands which includes drawing commands, text-setting commands and valid Postscript® expressions, and such as date-specific commands that include person-specific commands for formatting personalized information and non-person-specific commands for formatting other date specific information.

The following is an exemplary segment of the HPDL commands used in this invention:

~pgx 8.5 72 mul def/pgy 11 72 mul def/bottomborder 18 def/topborder 36 def

~/step pgy topborder sub bottom border sub 41 div def~{move 36 bottomborder step 3 mul a 2 a~}

(Jan. 21, 1949•Day 21, 344 Days Left).

In translating the segment of commands above to a PDL, default definitions (the items between the tildes) are translated directly as the PDL commands. The command to define the page width, "pgx", sets the page width to be 8.5 times 72 points per inch. The command to define the page height, "pgy", performs a similar task for the page height. The subsequent commands "bottomborder" and "topborder" define the top and bottom borders.

The next line defines "step" to be the page height minus the top and bottom borders, divided by 41 intervals. In other words, the "step" is defined by using relative position without ever specifying the numeric value of "step". The "MOVE" command shown above takes 2 arguments: an x-axis location and a y-axis location. Since the Postscript® origin is conventionally defined to be in the lower left corner of the page, this "MOVE" command places the current print position at a location that is 36 points from the left edge of the page, and 2 points above a location that is 3 steps above the bottom border of the page. The text string enclosed in parentheses is then typeset in the new print position by the default parameters. From the above, it should be readily apparent that the HPDL shorthand can be implemented in a number of ways, and that the exact syntax and symbols in the example above can be replaced by an equivalent language capable of performing similar functions.

As shown above, since only a few definitions in the arrangement of a page are given actual numeric values, all other definitions, namely, the relative positional definitions, are preferably derived algebraically from them.

In addition, the non-date specific commands include commands to place print marks such as cutting marks and folding marks on the printed pages. The print marks are used in subsequent production assembly-lines where the print marks are utilized for mechanized automatic cutting and folding of the prints in making packaged calendars. For example, a cutter will cut the prints along the cutting marks, and a folder will fold the prints along the folding marks.

The date-specific commands format graphics and texts which change from date to date or change from one individualized calendar to another. The date-specific commands initially are not associated with a calendar date. Once the date-specific command is parsed into arguments, and before the actual command is executed, all arguments delimited by special characters, such as "@", are replaced by date-specific text which is a text string relating to a specific date.

Some date-specific commands are non-person-specific commands which relate to the names of the months and days of the week. Since the text string relating to the non-person-specific commands do not change, they are hard-coded into the command file commands once the command file is associated with a specific date.

The date-specific commands also include person-specific-commands which relate to the personalized information including the national holidays of the selected country or the special dates selected by the customers. Since personalized information changes every year and from one customer to another, the text strings for the person-specific-commands are dynamically read in from files containing the personalized information. The files are formatted preferably as ASCII files.

The following is a list depicting a set of date-specific commands:

{month-name @monthdayyear1@}—"write the name of the month";

{retrieve string @monthdayyear2@}—"retrieve a string from a holiday list";

The first command is an example of a non-person-specific command. When the field between @ symbols are associated with a specific date, such as "monthdayyear1"=Feb. 1, 1998, then "February" is formatted because the command causes the name of the month to be written. The second command is an example of a person-specific command. When a specific date, such as "monthdayyear2"=Jul. 4, 1998, is associated with the command, and if the associated date is a holiday, then the string describing that date in the holiday list is retrieved. In this example, the retrieved string would be, "Independence Day".

Referring back to FIG. 7, the dates and the texts relating to the dates are formatted only after date-specific commands in the command file have been executed.

Figure 9:
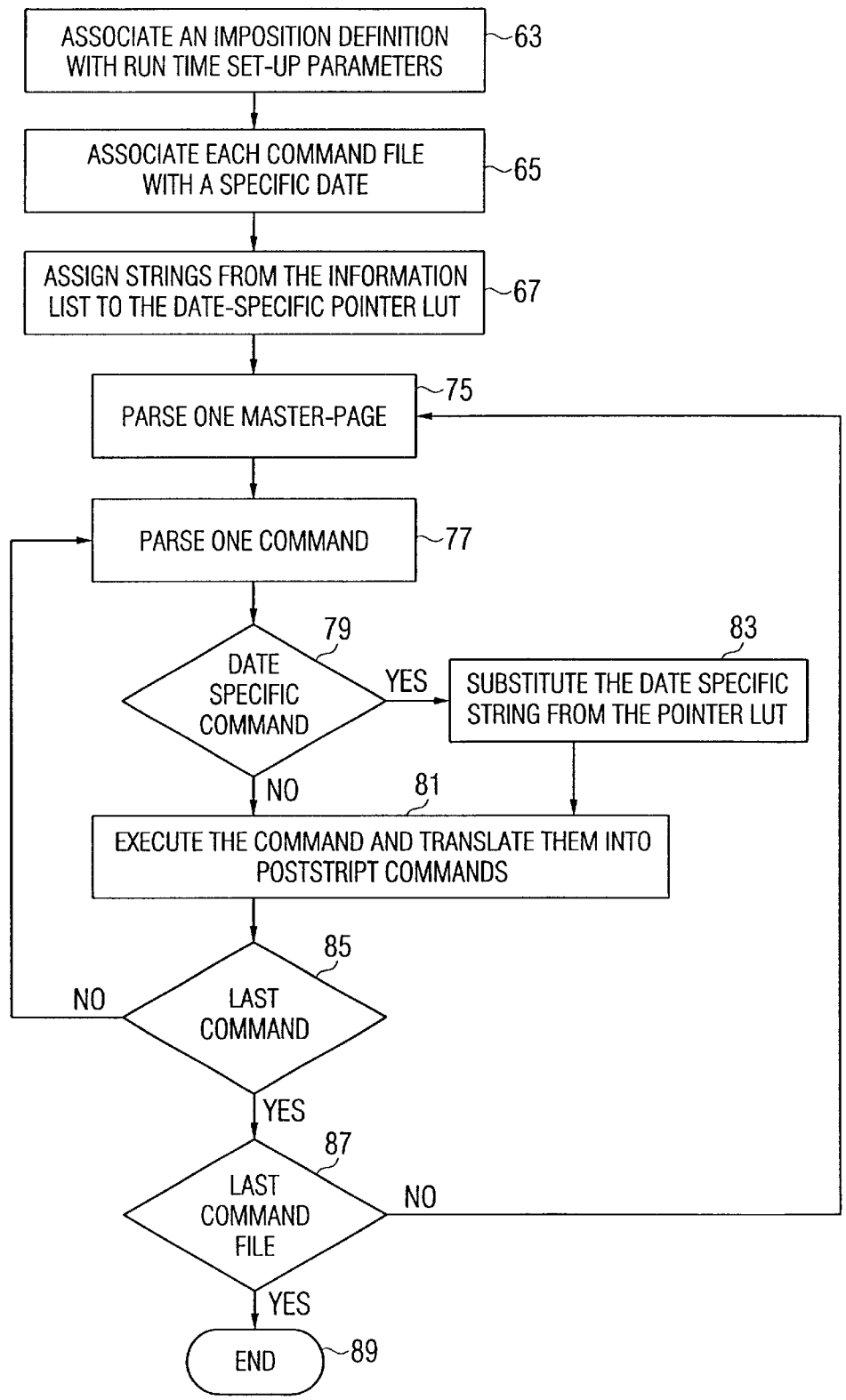
FIG. 9 is a flow chart of the imposition definition execution steps.

Referring to the flow chart of FIG. 9, in step 63, the formatting scripts in an imposition definition is associated with run-time set-up parameters. This step is preferably initiated by the batch-print-run described above. In another embodiment, however, the run-time set-up parameters are generated preferably by the GUI 37. The run-time set-up parameters include the calendar date range, the preferred language, the number of copies, the personal event list and the holiday list. Each command file 55, 57, 59 referenced by the formatting script of the imposition definition is then associated with a specific date, step 65. Using the information from the run-time set-up parameter, the information content of the selected holiday list and the personal event list are associated with a look-up-table (LUT) of pointers, step 67. In this context, the term pointer refers to the conventional data structure concept of providing information as a data location not the data itself. As shown in FIG. 5, the date pointers in the LUT 69 point to the locations of corresponding dates in the holiday list 71 and the personalized event list 73.

Referring back to FIG. 9, the commands in the first referenced command file 55 are parsed. Then each command is parsed one at a time in steps 75 and 77. If the parsed command is not a date specific command, then the command is directly translated into PDL commands, preferably Postscript® commands, steps 79 and 81. If the parsed command is a non-person-specific command, then the name of the month, the day of the week, the date and the year are inserted as a text string. If the parsed command is a person-specific command, then the string pointed to by the corresponding date pointer in the LUT is inserted as a text string in step 83. The inserted text strings are dynamically formatted and translated preferably into Postscript® commands in step 81. The translating step includes setting the font and size of the text string. These steps are repeated until all of the definitions in the imposition definition are executed in steps 85, 87 and 89 in which the above steps exhaust the commends and format scripts.

The translated PDL commands are sent to a printer that can be driven by the PDL. In another embodiment, the translated PDL commands are sent to a display monitor which can display what is to be printed by the PDL commands. This allows the final product to be viewed on the display monitor and proofread prior to printing.

The imposition definition 35 and the command files 55, 57 and 59 are all stored in computer memories shown in drawings. The execution of formatting scripts in the imposition definition and translating the commands in the command files are performed by a processor shown in the drawings, a series of processors or a main processor in combination with sub-processors. The processor is preferably a Central Processing Unit (CPU) inside of a computer. The computer is preferably a Personal Computer (PC), although a UNIX® based workstation, Macintosh® or other computer platform is suitable. In another embodiment, a series of computers are linked together, and, in yet another embodiment, the processor is a stand alone microprocessor. In one preferred embodiment, the processors are placed in a location 93 and the printing is completed in another location 95, as shown in FIG. 2.

Figure 10:
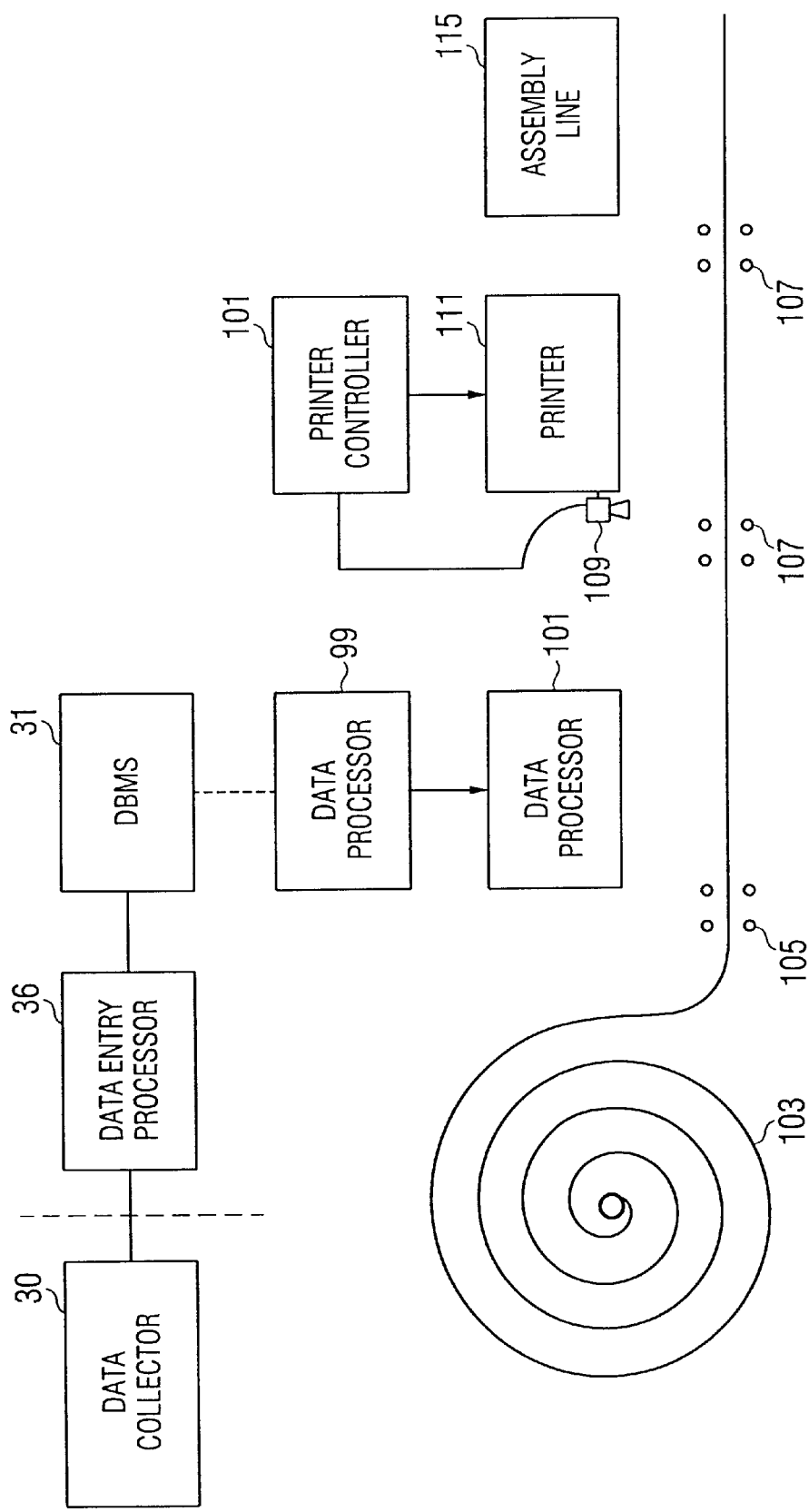
FIG. 10 is one preferred embodiment of the present invention.

As illustrated in FIG. 10, in another preferred embodiment, a data processor 99 is provided to receive the customer selections stored in the DBMS 31. The data processor 99 in turn is connected to a high speed digital printer 101. A printer controller 113 is connected to a conventional high speed commercial printer 111 and to a camera 109 which is attached to a feeding end of the printer 111. A supply of printer medium 103, on which the individualized calendars are to be printed, is automatically and continuously fed through the digital printer 101 and the printer 111 by a plurality of rollers 105 and 107. The supply of printer medium is preferably a continuous paper web. In other embodiments, sheeted papers or plastic sheets are the printer medium. In the preceding embodiment a conveyor belt replaces the rollers to continuously and automatically feed the sheeted papers or the plastic sheets. An assembly line 115 is configured to receive the printed individualized calendars and assemble them into final products that can be shipped to the customers.

Upon receiving requests from the customers to print individualized calendars, the corresponding personalized information is sent from the DBMS 31 to the data processor 99. The data processor 99 contains a memory in which a variable portion of the pre-formatted calendar layout information is stored. The variable portion of the pre-formatted calendar layout includes portions of the individualized calendar which change from one date to another or from one individualized calendar to another. For example, referring to FIG. 7, the variable portion of the pre-formatted calendar layout includes formatting information relating to print objects such as the dates 125, the days of the week 127, the name of the month 121, the year 3, and a calendar object such as the small calendar 62. The variable portion of the pre-formatted calendar layout also includes the personalized information and where the preceding items are to be printed on the individualized calendar.

For implementing this embodiment, the HPDL commands and the imposition definition described above are utilized in reference with FIG. 5. For example, the date-specific commands are employed to format the personalized information other date specific information such as the calendar objects.

The digital printer 101 is preferably a laser printer and more preferably a plurality of laser printers. The digital printer 101 prints the variable portion of the individualized calendars that have been formatted by the data processor 99. The resulting printed products after the digital printer 101 include at least one print object printed with the personalized information for one calendar date.

In the printer 111, a print plate or a drum presses against the print medium 103 to print a portion of the individualized calendars. The non-varying portion includes portions of the calendars that do not vary from one date to another or from one calendar to another which relates to non-date-specific commands described above in reference to FIG. 5. For example, again referring to FIG. 7, the non-varying portion includes horizontal and vertical lines which form a calendar pattern. Hence, the print plate mounted in the printer 111 has the non-varying portion of the individualized calendars etched on to its printing surface.

In this digital printer 101 and the printer 111 setup, the printed calendars have both the variable portion and the non-varying portion, which in combination form the individualized calendars. This embodiment facilitates a mass production of the individualized calendars.

Figure 1:
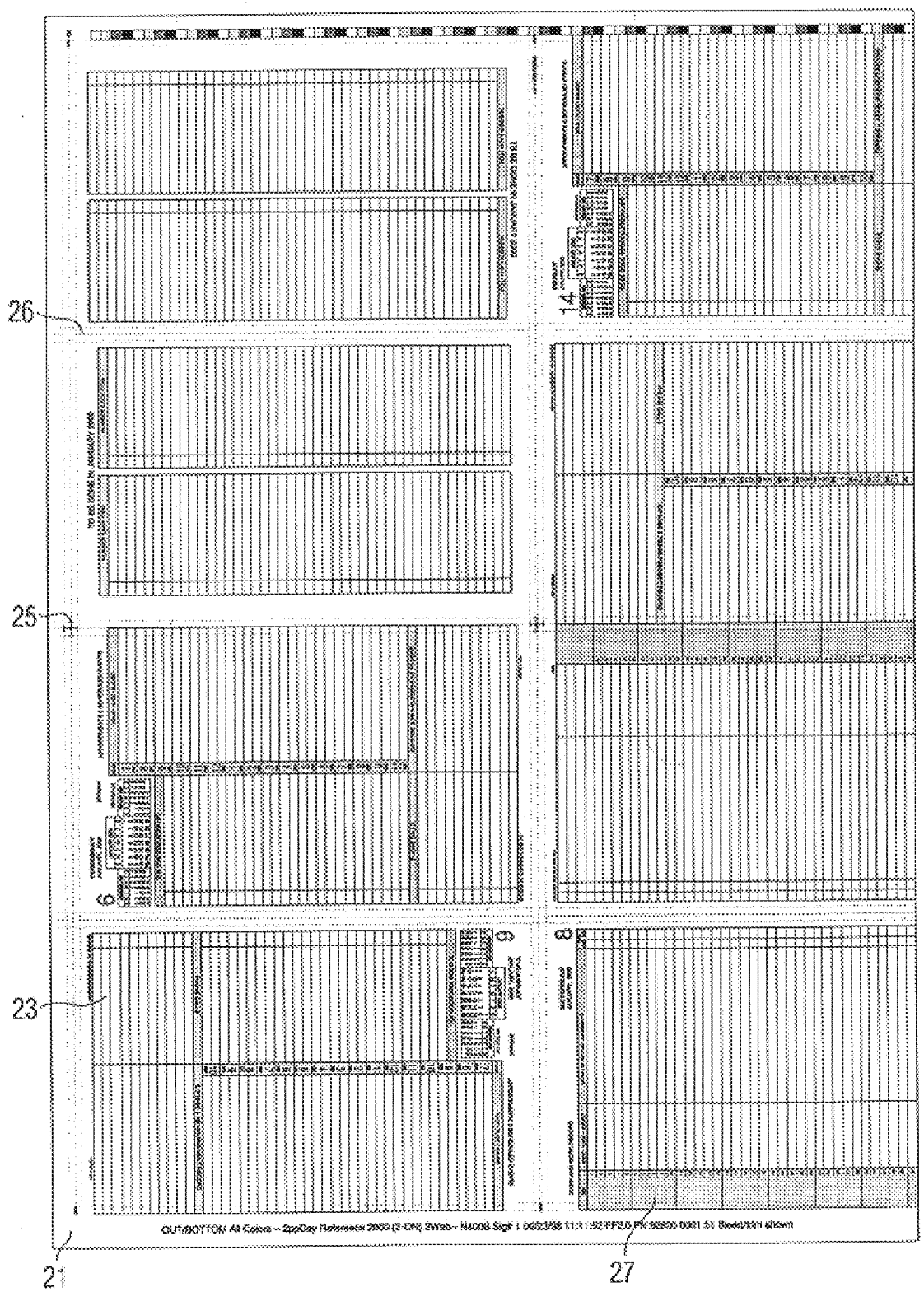
FIG. 1 is an example of a signature page printed by the commercial printing method.

In another aspect of the this embodiment, print marks, such as folding, cutting and lift marks 129, which do not change from one calendar to another are either formatted in the variable portion of the pre-formatted layout or etched on the print plate. The folding and cutting marks are similar to the folding 26 and cutting marks 25 in FIG. 1. Therefore, the print marks can printed by the digital printer 101 or the conventional printer 111.

In one preferred embodiment, the printer 111 has a plurality of print presses each of which can be configured to print different color portions or different calendar pages of the individualized calendars.

For example, in making the individualized calendar, a first print press prints the non-varying portion of a weekly planner illustrated in FIG. 6, and a second print press prints the non-varying portion of a monthly planner illustrated in FIG. 7. In this example, a lift mark 129 is printed on each of the monthly planners printed by the digital printer 101. The lift mark 129 is optically detected by the camera 109 which sends detection signals to the controller 113. The controller 113 is configured to control the printer 111; the controller 113 also utilizes the detection signals such that the printer 111 lift the plate of the first print press, which causes the non-varying portion of the weekly planner not to be printed, and drops the second print press, which causes the non-varying portion of the monthly planner to be printed on the portion of variable portion of the monthly planner printed by the digital printer 101. In this way, the monthly planners and the weekly planners are printed in a sequence on one continuous supply of print medium.

In another preferred embodiment, the printer 111 prints before the printer 101 prints on the print medium. In other words, the location of the printer 111 and printer 101 can be reversed. In this embodiment, the camera is attached to the printer 101 and the detection signals are sent to the data processor 99. Furthermore, the data processor 99 controls the printer 101 to print the corresponding variable portions.

The printed individualized calendars are sent to the assembly line 115 for automatically assembly the printed individualized calendars. The assembly line 115 includes mechanical means to cut along the cutting marks and package the printed individualized calendars on a front page thereof.

In one embodiment, the data processor 99 and the two printers 101, 111 are configured to print address labels of the requesting customers for each of individualized calendars on a front page thereof. This allows the final packages at the assembly line to be shipped out to the customers without needing to reference another list.

The data processor 99 and the printer controller 113 are preferably a Personal Computer (PC), although a UNIX® based workstation, Macintosh® or other computer platform will suffice.

One of ordinary skill in the art can envision numerous variations and modifications to the invention disclosed herein. For example, the run-time set-up parameters or the command file can be hard coded into the imposition definitions 35 or one computer may function as the data controller 99 and printer controller 113. All of these modifications are contemplated by the true spirit and scope of the following claims.

What is claimed is:

1. A printing method of making an individualized calendar, the method comprising the steps of:
   (a) selecting personalized information for an individual for whom the calendar is to be made, said personalized information including:
      (i) a special event date, and
      (ii) a description of said special event;
   (b) receiving said personalized information at a location remote from where said personalized information is selected;
   (c) storing calendar layout information for formatting a print layout of a non-individualized calendar;
   (d) simultaneously formatting and translating said personalized information along with said calendar layout information, thereby creating a formatted and translated individualized calendar; and
   (e) printing said formatted and translated individualized calendar.

2. The method of claim 1, wherein said calendar layout file is prepared prior to said step of retrieving by:
   (i) writing to said calendar layout file, at least one first format script which references a first command file, said first command file arranged to format said calendar page layout, and
   (ii) writing to said calendar layout file, at least one second format script which references locations in which said personalized information is stored.

3. The method of claim 2, wherein said calendar layout file is further prepared by:
   writing to said calendar layout file, additional first format scripts, said additional first format scripts referencing a plurality of command files, each of said command files arranged to format a distinct calendar page layout.

4. The method of claim 2, wherein said first command file is prepared by:
   (a) writing to said first command file, at least one date-specific command which formats personalized information referenced by said second format script, and
   (b) writing to said first command file, at least one non-date-specific command which formats said calendar page layout, wherein said date-specific and non-date-specific commands are written in a print description language.

5. The method of claim 4, wherein the step of formatting said personalized information along with said calendar layout file, includes the steps of:
   (a) associating said date-specific command with a specific date within said predetermined calendar period; and
   (b) formatting said description of said special event into a low level print language directly interpretable by a printer, only if said special event date matches said specific date.

6. The method of claim 4, comprising the additional step of:
   writing an additional command for printing a print mark for an assembly line production of said calendar.

7. The method of claim 4, comprising the additional step of:
   writing an additional command for drawing graphical objects in terms of a relative positional definition in formatting said calendar page layout.

8. The method of claim 1, wherein said step of selecting includes
   (a) selecting birthdays and anniversaries of family members, and
   (b) selecting a country whose national holidays are to be printed on the individualized calendar.

9. The method of claim 1, comprising the additional step of viewing at least a portion of said individualized calendar, before it is printed.

10. The method of claim 2, wherein said calendar page layout corresponds to a page of a daily planner.

11. A printing system for making an individualized calendar comprising a plurality of dates over a predetermined calendar period, comprising:
   (a) a medium for inputting personalized information selected for an individual for whom the calendar is to be made, said personalized information including:
      (i) a special event date, and
      (ii) a description of said special event;
   (b) a data entry processor arranged to receive said personalized information, said data entry processor situated at a location remote from where said personalized information is selected;
   (c) a first memory connected to said data entry processor and configured to store said personalized information;
   (d) a first processor arranged to receive personalized information from said first memory, and simultaneously format and translate a non-date-specific portion that includes a calendar pattern and a date-specific portion of the individualized calendar that includes at least one calendar date and a description of a special event occurring on that calendar date;
   (e) a first printer arranged to print said date-specific portion on a print medium; and
   (f) a second printer arranged to print the non-date-specific portion of said individualized calendar on said print medium.

12. The system of claim 11, wherein said first printer is a digital printer, and said second printer is distinct from said first printer, and spaced apart therefrom.

13. The system of claim 12, further comprising a camera arranged to detect a print mark on said print medium, said camera being positioned to perform said detection after one of said date-specific portion and said non-date specific portion has been printed on said print medium.

14. The system of claim 11, wherein said first and second printers comprise a single digital printer.

15. The system of claim 11, further comprising a supply of said print medium arranged to automatically feed print medium toward said first and second printers; and an apparatus arranged to assemble a plurality of individualized calendars after said first and second printers have printed said date-specific and non-date specific portions on said print medium.

16. The system of claim 15, wherein said apparatus is arranged to cut and fold said print medium, and then package said individualized calendars.

17. A printing method of making at least one individualized calendar, said individualized calendar having a plurality of dates corresponding to a predetermined calendar period, the method comprising the steps of:

(a) selecting personalized information at a first location for an individual for whom the calendar is to be made, said personalized information including:
   (i) a special event date, and
   (ii) a description of said special event;

(b) receiving said personalized information at a second location remote from said first location where said personalized information is selected;

(c) simultaneously formatting and translating a non-date-specific portion that includes a calendar pattern, and a date-specific portion of the individualized calendar that includes at least one calendar date and a description of a special event occurring on that calendar date;

(e) printing said date-specific portion on a print medium; and (f) printing the non-date-specific portion of said individualized calendar on said print medium.

18. The method of claim 17, comprising the additional step of detecting a print mark on said print medium, before the step of printing said non-date-specific portion.

19. The method of claim 17, comprising the additional steps of:

continuously feeding print medium prior to printing on said print medium; and automatically assembling a plurality of individualized calendars after said printing steps, to thereby make a plurality of individualized calendars, each of said plurality of individualized calendars being different from one another.

20. The method of claim 19, wherein said step of automatically assembling, includes the steps of cutting and folding said print medium, and then packaging said plurality of individualized calendars.

* * * * *